United States Patent [19]

Hunter et al.

[11] Patent Number: 4,498,051
[45] Date of Patent: Feb. 5, 1985

[54] HIGH ENERGY LASER

[76] Inventors: Robert O. Hunter, 1811 Verano Pl., Irvine, Calif. 92664; David L. Fried, 5362 S. Ohio St., Yorba Linda, Calif. 92686

[21] Appl. No.: 281,638

[22] Filed: Jul. 9, 1981

Related U.S. Application Data

[62] Division of Ser. No. 23,987, Mar. 26, 1979, Pat. No. 4,337,437.

[51] Int. Cl.³ .................... H01S 3/05; H01S 3/10
[52] U.S. Cl. ..................... 330/4.3; 350/174; 372/95
[58] Field of Search ............ 330/4.3; 350/174; 372/95, 101, 108

[56] References Cited

U.S. PATENT DOCUMENTS

| 3,501,223 | 3/1976 | Roch | 350/174 |
|---|---|---|---|
| 4,001,705 | 1/1977 | Sinclair et al. | 330/4.3 |
| 4,321,551 | 3/1982 | Blieh et al. | 330/4.3 |

FOREIGN PATENT DOCUMENTS 1440538  6/1974  United Kingdom ............... 350/171

OTHER PUBLICATIONS

Stepanov et al., "Diffraction in a CW . . . Telescope Cavity", 3/79, pp. 333-336, Sov. Phys. Tech. Phys. 24 (3).
Brodov et al., "Investigation of . . . Glass Plate", 1/82 (by see articles cited at p. 79), pp. 77-89, Sov. Jour. of Quant. Electron., 12 (1).
White et al., "Narrow Linewidth . . . Laser Source", 6/12/81, (but see references cited), p. 80, IEEE Cleo. 81.

*Primary Examiner*—Nelson Moskowitz

[57] ABSTRACT

An apparatus and process for pumping a lasing media (preferably krypton fluoride) over a 500 nanosecond period and thereafter compressing and focusing to a target with a final 10 nanosecond compression wave is disclosed. An exciting 10 nanosecond pulse is shaped in an overall rectangular shape with the major axes vertically aligned and this shaped beam directed upwardly and to the side of a normal extending between parallel and opposed mirrors at remote ends of a chamber. The chamber includes at the top thereof a plurality of stripper mirrors aligned along axes substantially normal to the beam path and tilted upwardly to shave successive segments off the upper portion of the beam. Beam passage opposite to the direction of stripper mirror emission produces a series of emitted shaved beam segments each spaced temporally in accordance with stripper mirror separation. Typically, the telescope is angularly addressed at the lower power and inlet portion of the telescope, amplified in the vicinity of the higher power output and focused to an essentially coplanar scrambler mirror array. The final amplified output from the coplanar scrambler mirror array emits to pulse compression optical train to an outlet wherein final focus to a target for optical compression results.

29 Claims, 17 Drawing Figures

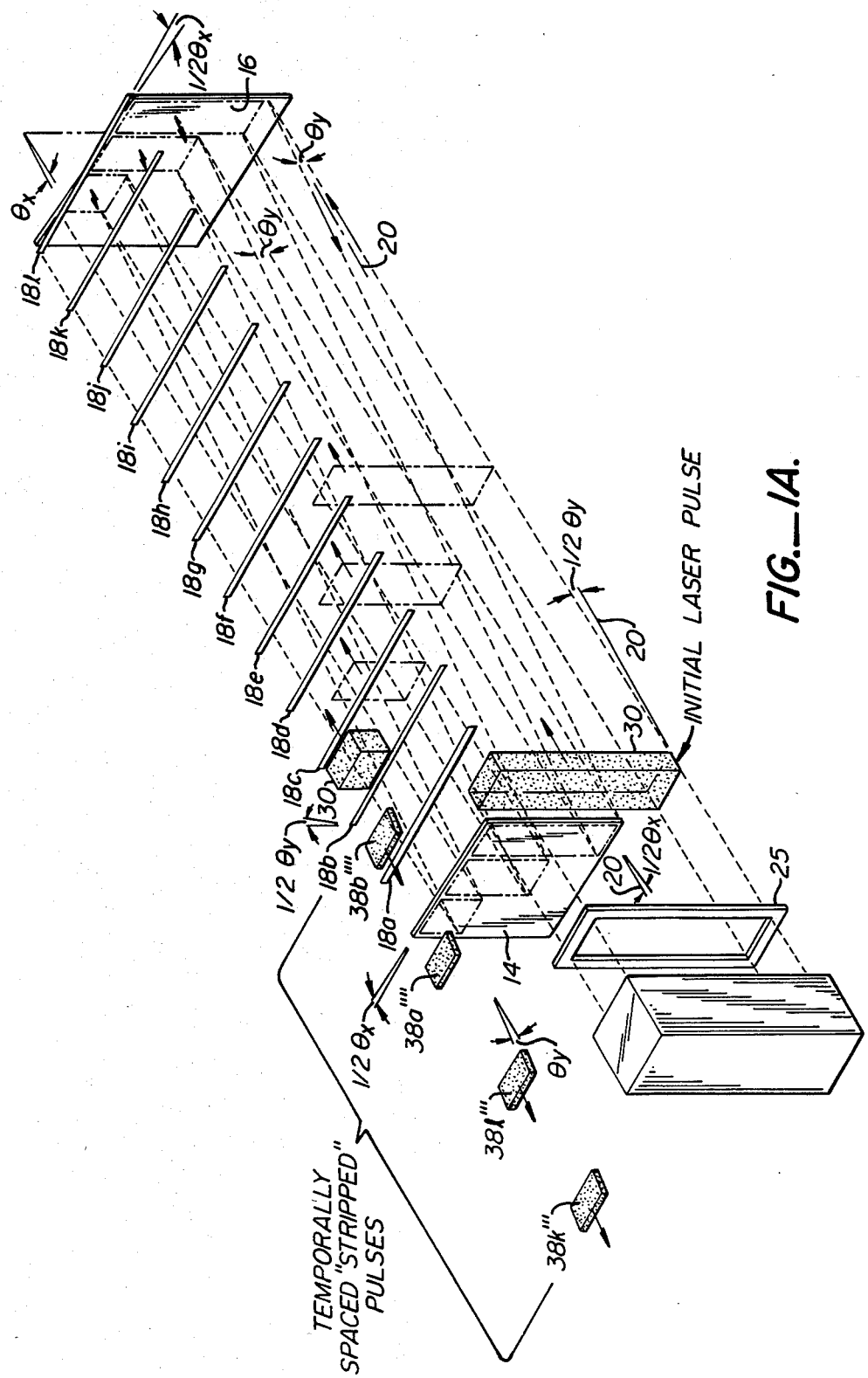

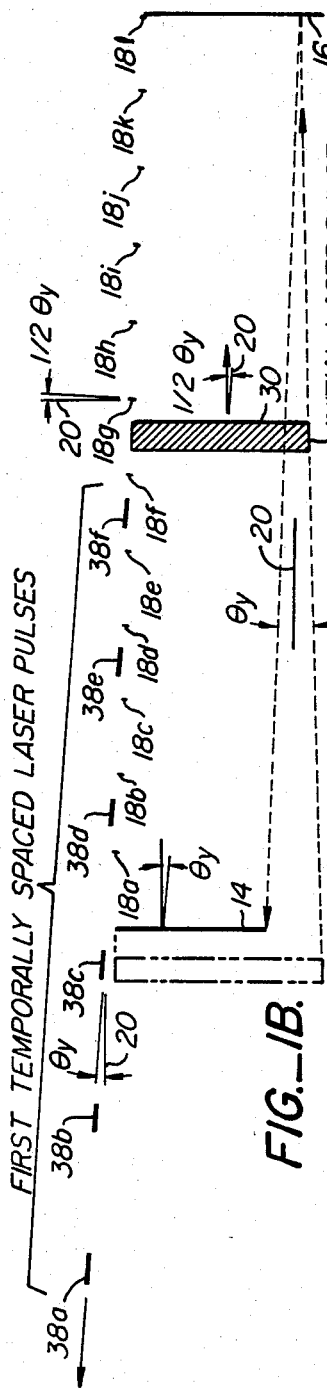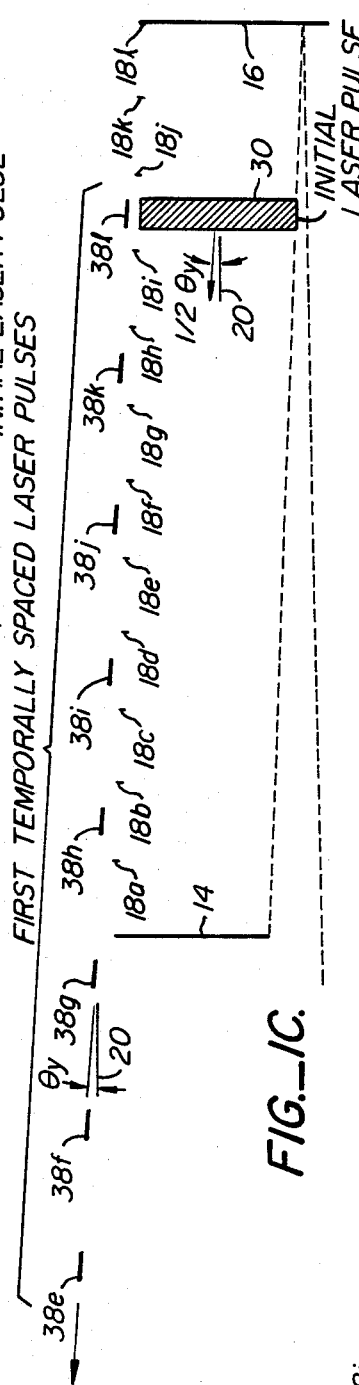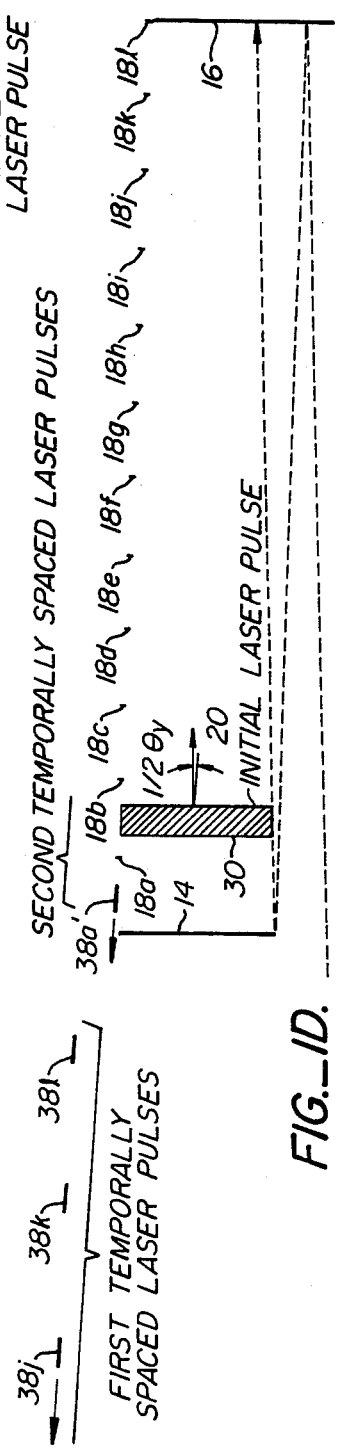
FIG._1B.   FIG._1C.   FIG._1D.

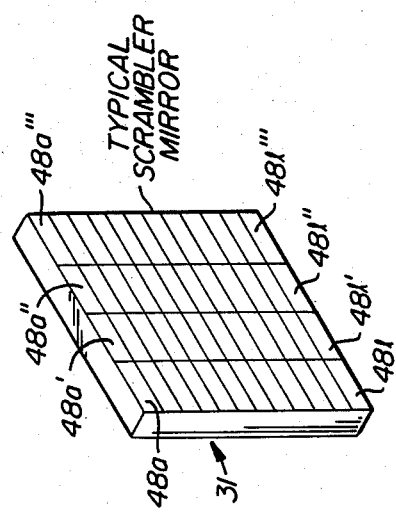
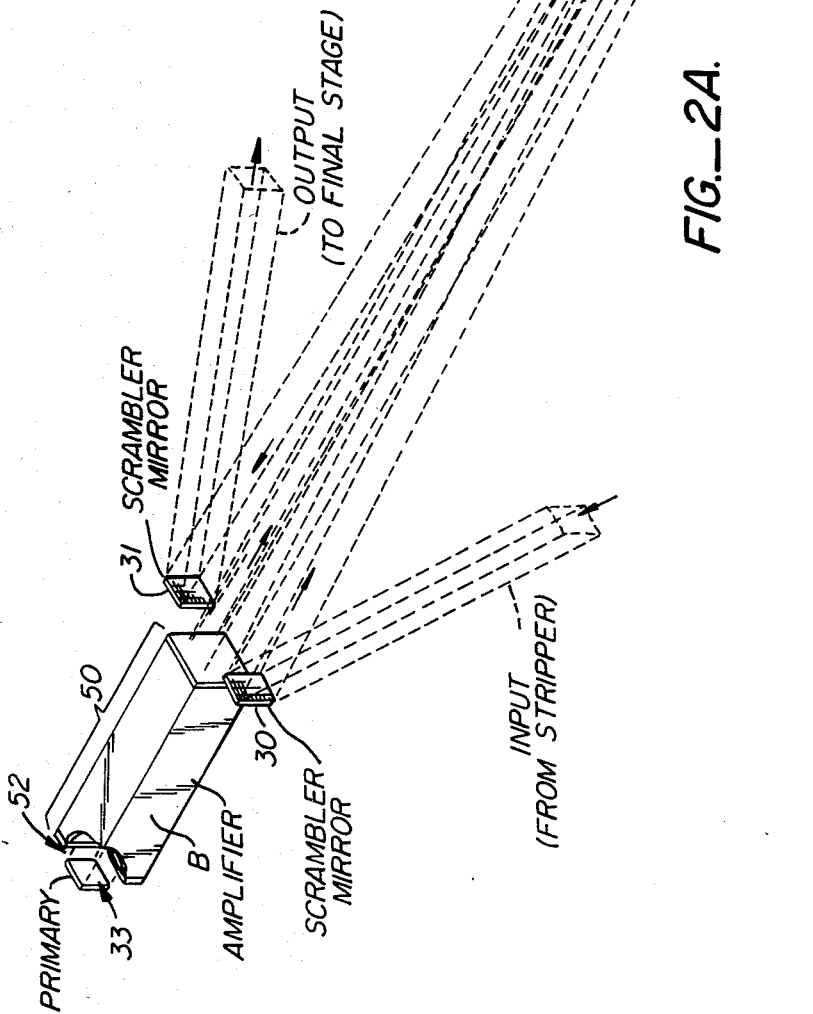

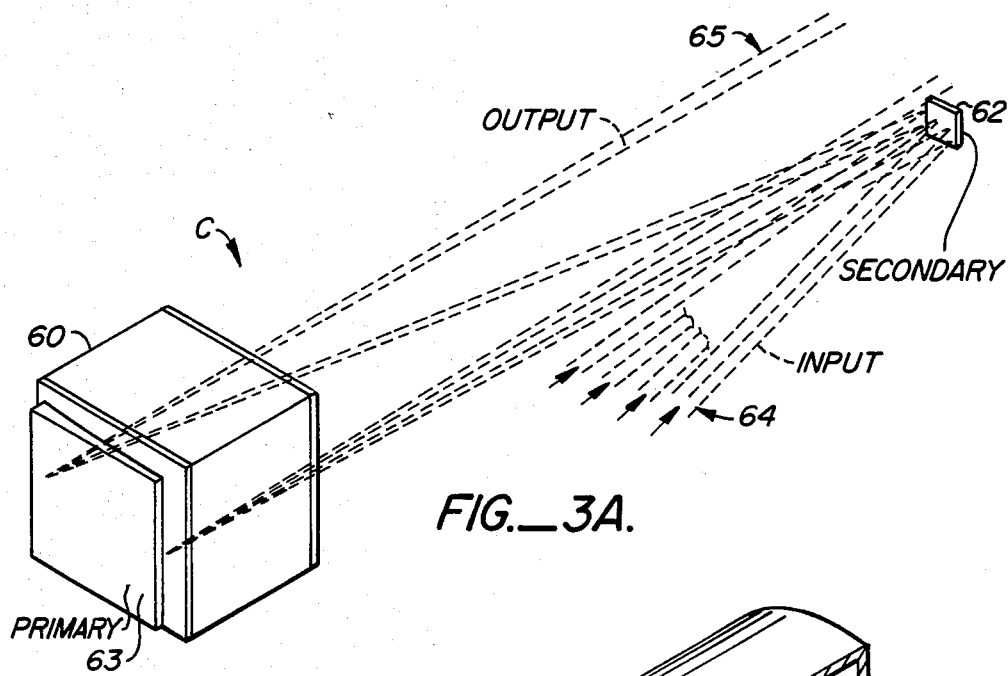
FIG._3A.
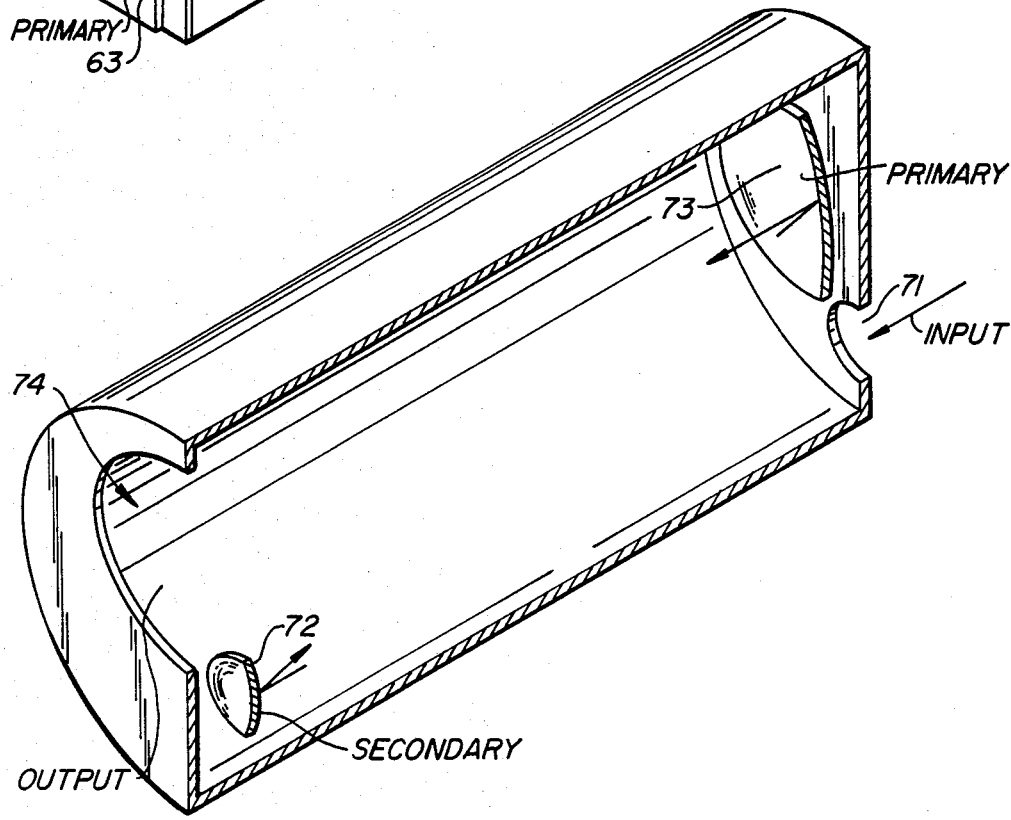
FIG._3B.

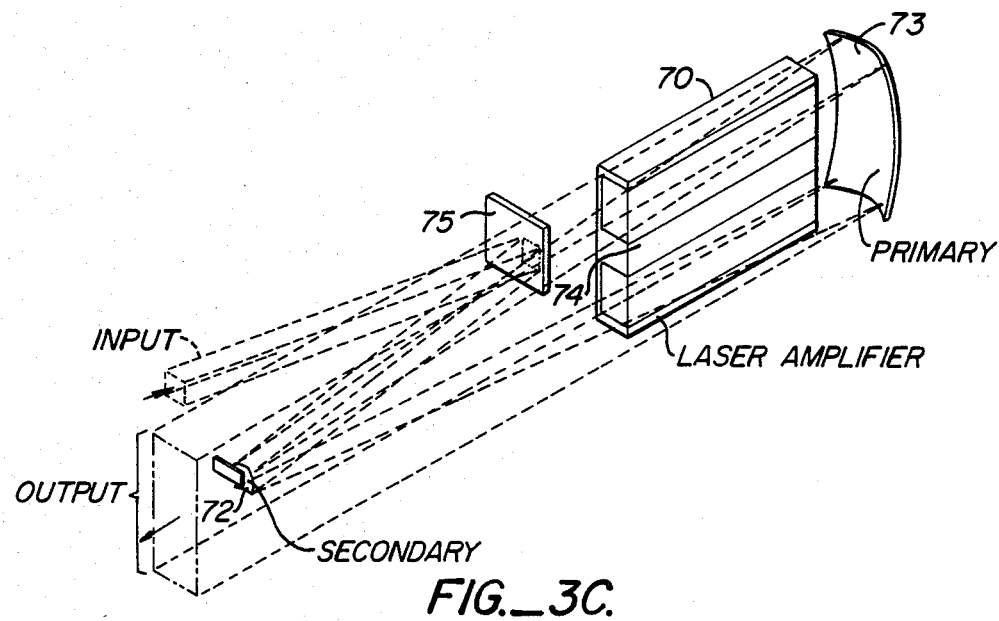
FIG._3C.
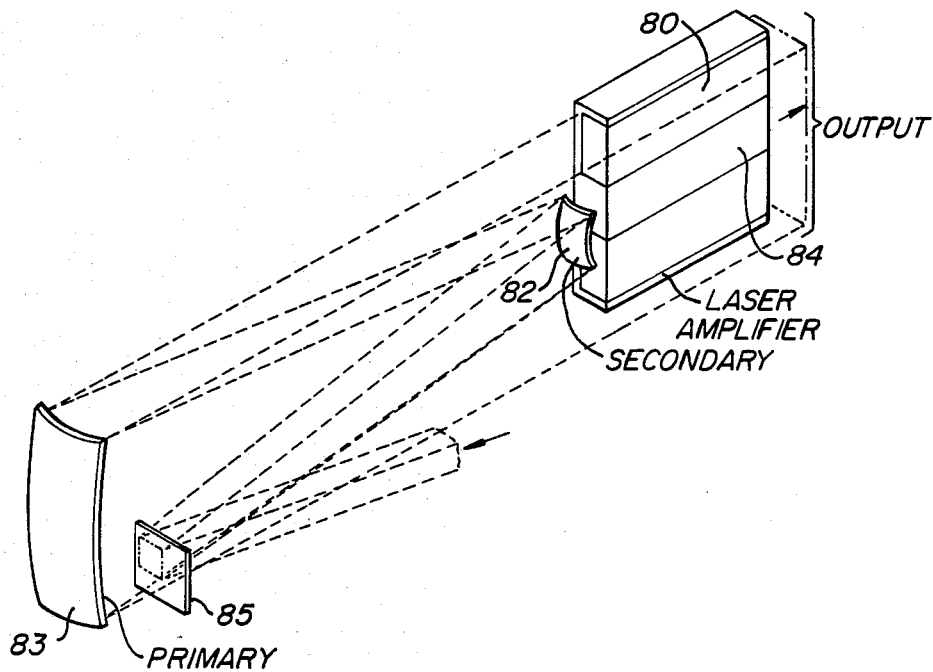
FIG._3D.

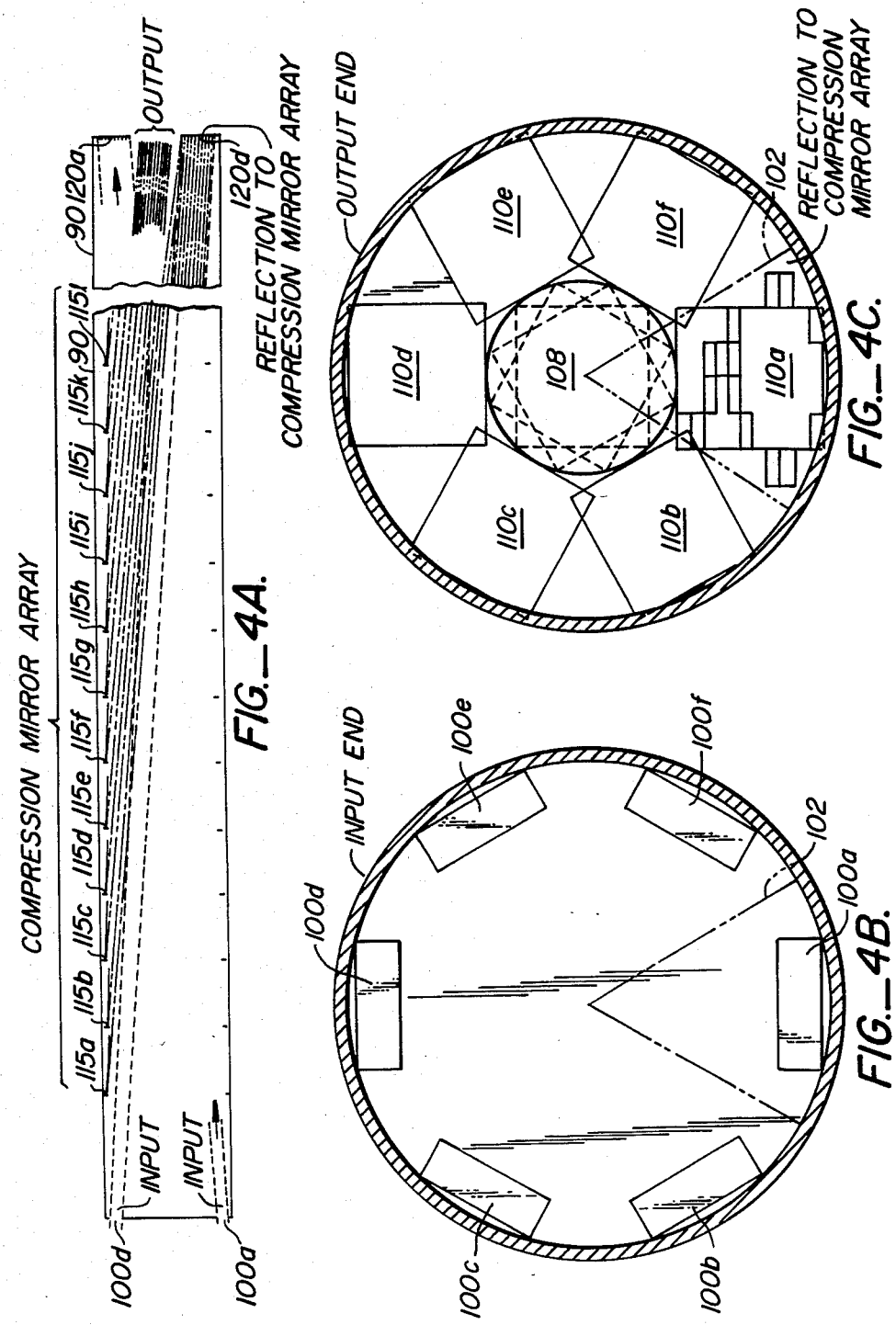

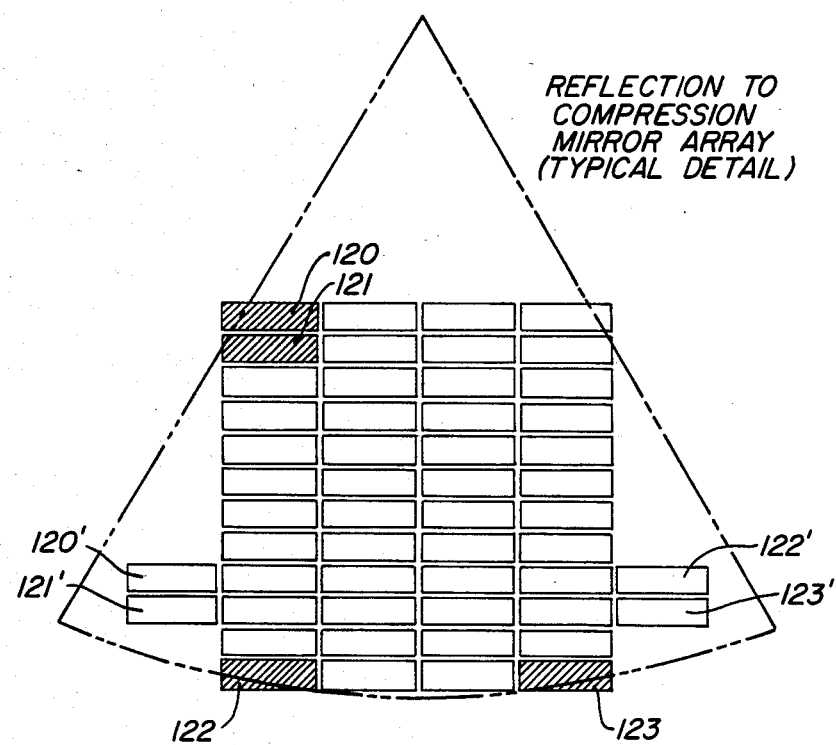
FIG._4D.

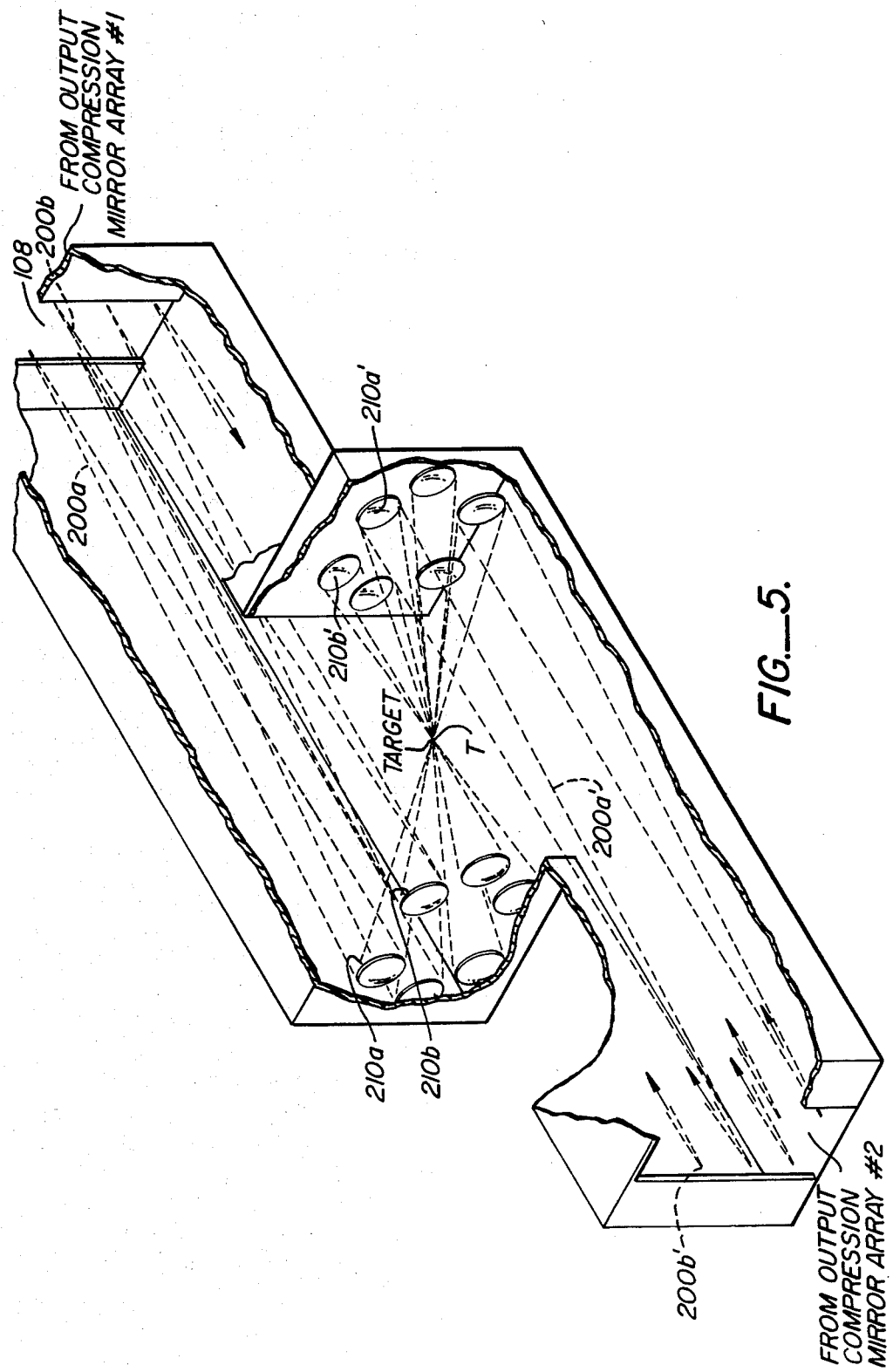
FIG._5.

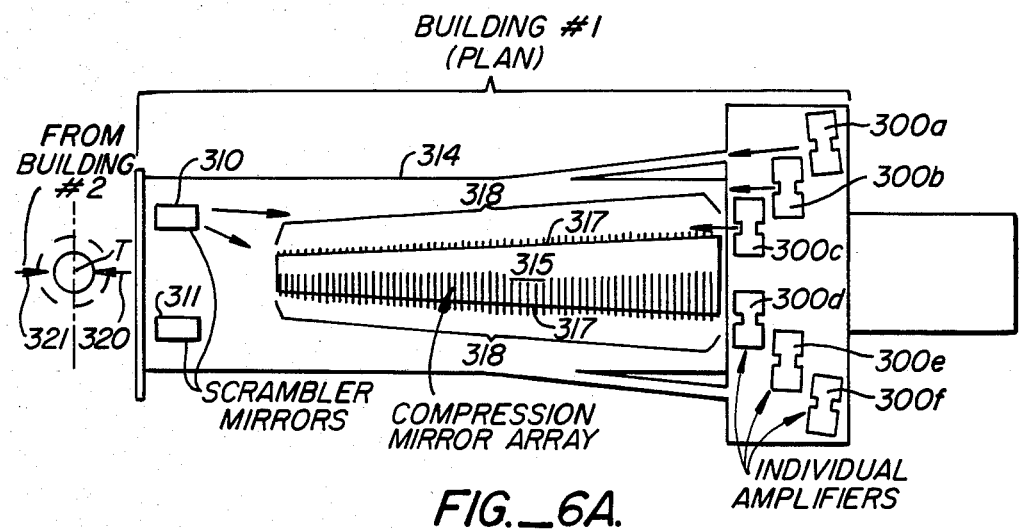
FIG._6A.
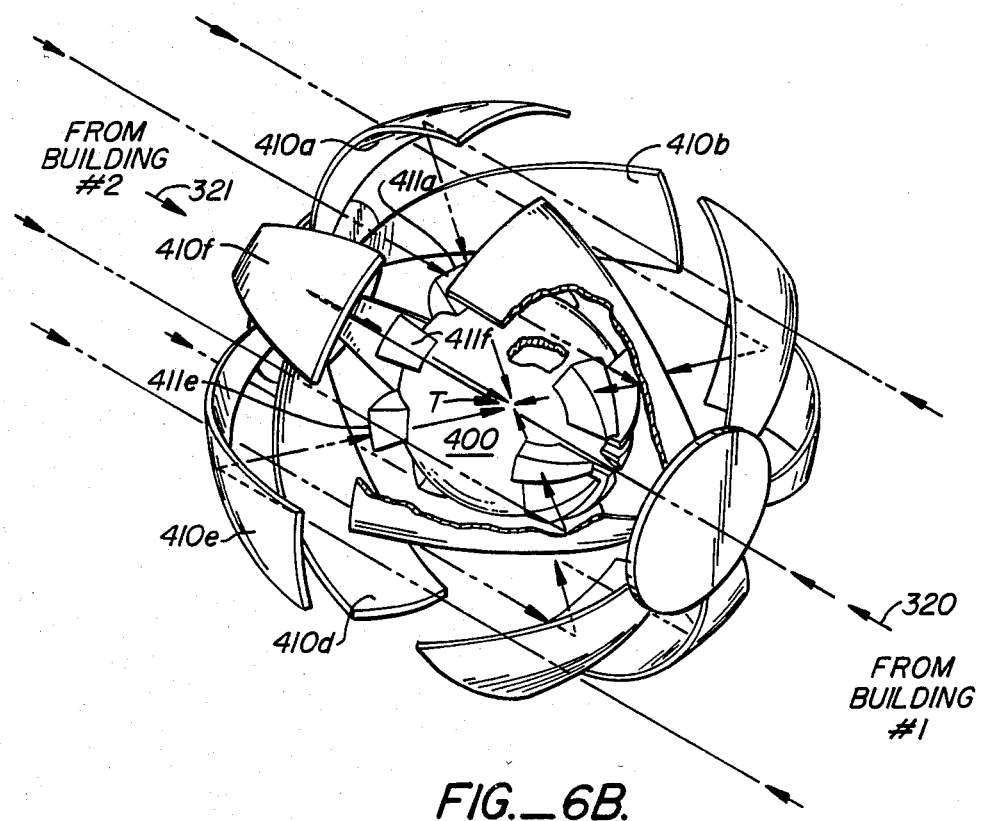
FIG._6B.

HIGH ENERGY LASER

This is a division of application Ser. No. 23,987, filed Mar. 26, 1979, now U.S. Pat. No. 4,337,437.

HIGH ENERGY LASER

This invention relates to an apparatus and process for pumping a lasing media (preferably krypton fluoride) over a 500 nanosecond period and thereafter compressing and focusing to a target with a final 10 nanosecond wave. Specifically, a technique for generating a matrix of temporally spaced waves for amplification in separately controlled paths is disclosed. Amplification occurs in sequence in a laser amplifier incorporated in telescope optics. Clustering of simultaneously excited groups of laser beams is disclosed for energy levels in the order of 1 megajoule in the compressed optical pulse.

SUMMARY OF THE PRIOR ART

It has been proposed in the prior art to sequentially lase an amplifier with temporally spaced exciting beams. Typically, these respective beams are then directed along separate optical paths to a pulse compression network. At the pulse compression network, spaced mirrors return the waves simultaneously to a target—typically with focus—so that the sequential pulses combine to form a compressed optical pulse.

Previously, the multiplicity of optical paths through the laser amplifier has been a problem. Specifically, as more paths are routed through the same amplifier, it has been necessary to establish angularities with respect to each path. Separate mirror systems, one for each path, create an array of mirrors, which produces difficulties.

These difficulties include the fact that the path through the laser amplifier is subject to vignetting. As the beams address the path through the amplifier at differing angularities, greater portions of the excited lasing media within the laser amplifier become vignetted. When this occurs, the laser cannot operate at optimum optical efficiency.

Moreover, precision optical mirrors have high costs. Consequently, it is desirable to minimize the number of such mirrors and to load them by optical energy pulses at or near their maximum energy tolerance. Where separate mirror systems are used for each optical path, the mirrors unduly multiply in number and, therefore, cost. Moreover, where mirrors are crowded in an array about a single laser amplifier, they usually must be spaced at varying distances from the amplifier to prevent losses due to vignetting. When such spacing at distances from the amplifier occurs, the mirrors themselves are frequently loaded at less than their maximum energy tolerance. Excess mirrors are required, which results in excess laser costs. Partly as a result of the above deficiencies, high compression ratios previously have not been possible in a single sequentially lased laser amplifier.

Robert Olin Hunter, one of the coinventors herein, previously has proposed chromatically addressing a single laser amplifier with discrete color bands. These color bands were disclosed as preferably taken from the relative broad band of excitation of the krypton fluoride excimer in a laser amplifier. This scheme suffers from practical disadvantages.

Chromatic address of the discrete beam components causes movement of the beam typically in one direction only. The difficulties in handling beams that comprise together 50 all vertical or 50 all horizontal beam slices results in a poor aspect ratio optics. In such designs, diffraction losses are higher, since more perimeter per unit area to the impinging beams results.

Moreover, in such chromatically addressed devices, diffraction gratings are used. These gratings have energy losses, must be constructed of extremely fine divisions, and are of large, and hence expensive, size.

Further, the chromatically addressed beams each require discrete and narrow band width. Due to optical phenomena known as Roman scattering, the narrow band width of the discrete exciting color bands is less convenient when used in air. Specifically, passage through air changes the color of the beams sufficiently to destroy or degrade the required monochromatic nature of the light.

Finally, the chromatically addressed system requires a broad energy line of lasing media, so that the superimposed and discrete lasing colors can each occupy a discrete segment of the entire lasing spectra of the media. Unfortunately, many highly desirable lasing medias are narrow band in their emission. These medias are disqualified from the chromatic address concept set forth above.

SUMMARY OF THE INVENTION

An apparatus and process for pumping a lasing media (preferably krypton fluoride) over a 500 nanosecond period and thereafter compressing and focusing to a target with a final 10 nanosecond compression wave is disclosed. An exciting 10 nanosecond pulse is shaped in an overall rectangular shape with the major axes vertically aligned and this shaped beam directed upwardly and to the side of a normal extending between parallel and opposed mirrors at remote ends of a chamber. The chamber includes at the top thereof a plurality of stripper mirrors aligned along axes substantially normal to the beam path and tilted upwardly to shave successive segments off the upper portion of the beam. Beam passage opposite to the direction of stripper mirrors produces a series of emitted shaved beam segments each spaced temporally in accordance with stripper mirror separation. The discrete beam patterns are intermediately amplified, shaped, and addressed through a "scrambling" mirror system to a laser amplifier incorporated within a telescope. Typically, the telescope is angularly addressed at the lower power and inlet portion of the telescope, amplified in the vicinity of the higher power output, and focused to an essentially coplanar scrambler mirror array. The final amplified output from the coplanar scrambler mirror array emits to pulse compression optical train to an outlet wherein final focus to a target for optical compression results.

OTHER OBJECTS AND ADVANTAGES OF THIS INVENTION

An object of this invention is to disclose a system of producing a sequence of 48 beams, all with temporal spacing 10 nanoseconds. These beams have the capability of being distributed to discrete optical paths of differing angularity. According to this aspect of the invention, an elongate chamber having parallel and opposed mirrors at opposite ends thereof is disclosed. A beam having a high height-to-width aspect ratio is introduced into the chamber and angularly aligned with respect to a normal extending between the mirrors. Specifically, beam alignment with respect to the normal is upwardly and to the side. The chamber includes a plurality of angled stripper mirrors for assigning to portions of the injected beam the discrete angularity required. Upon beam injection, the respective mirrors sequentially shave beam portions off the top of the beam and pass temporally spaced beams out from each stripper mirror. Upon rebound from the end wall (which typically includes a stripper mirror at the top), identical temporal spacing between the next and last emitted beam is preserved. Sideward translation of the beam occurs to align the beam for the next successive pass along the stripper mirrors, which produces an identical sequence of spaced beams preferably with differing paths. These paths are parallel but displaced to the side along nonoverlapping spatial exclusive paths. Dependent upon the length of the initial exciting pulse (here about 10 nanoseconds), the distance between the stripper mirrors (here about 1.5 meters), the number of mirrors (here 12), and the number of passes between the mirrors at opposite ends of the chamber (here about 4), a series of temporally spaced beams can result.

An advantage of this beam generation system is that the temporally spaced beams all have different paths. In subsequent processing and amplification downstream, these respective beams can be given separate, discrete, and non-overlapping optical paths, wherein each one of the beams may be individually routed or adjusted. Moreover, they can be addressed to the same common spatial volume (all with differing angularities), so that sequential amplification can occur with separate beam paths to and from the common spatial volume.

A further advantage of the beam generation apparatus and system is that diffraction losses can be maintained at a minimum. Specifically, each beam segment can have the perimeter-to-area ratio of its cross-section reduced.

A further advantage of this aspect of the invention is that the dividing of the exciting beam into discrete segments by stripper mirrors produces extremely low energy loss. Energy loss in the order of that experienced at diffraction gratings is not present.

Yet another advantage of this system is that it is no longer required to use broad band width lasing medias. Instead, narrow band width lasing medias can be used. Discretely separated band widths all contained within a broader band width of lasing media excitation are not required.

Yet another object of this invention is to disclose a laser amplifier incorporated to a telescope. According to this aspect of the invention, a telescope (preferably of the reflecting variety), includes secondary and primary optics. Discrete beams of excitation are all addressed with typically and relatively higher angularity to the telescope optics.

A further advantage of this aspect of the invention is that the number of mirrors utilized is vastly reduced. By utilizing telescope mirrors for passing all of the sequence beams (here about 48 separate temporally spaced beams) through the amplifier, the primary and secondary mirrors of the telescope are all the mirrors required. Since telescope optics are well-understood, by utilizing the differing angularities of light, one can obtain, through completely overlapped optical paths at the laser amplifier, discrete addressing of each of the amplified beams.

A further advantage of incorporating the laser amplifier to a telescope is that the mirrors utilized in the system can be packed to their full energy density. Specifically, by placing amplifier after passage from the final telescope primary optic, each emitted beam has the area and temporal spacings necessary to fully load the downstream optics. This reduces the number of mirrors required. Moreover, the telescope can be used for focus to assure maximum optical density.

A final object of this invention is to disclose an overall lasing path for a laser having a compression wave anywhere from 50 kilojoules to several megajoules. A sequence of optical elements is disclosed, including a pulse expander, intermediate amplifier, a beam expander telescope, and a laser power amplifier and telescope. Amplified light is emitted to compression optics and thence to a focusing chamber. By the expedient of strategically located scrambler mirrors, each light path can be individually directed for precise simultaneity of beam arrival at a focused object.

An advantage of the disclosed system is that the wave emission at all points throughout the system can be as broad or as narrow, as that wave that can be tolerated by any selected lasing media.

A further advantage of this invention is that propagation in air media is practicable. Construction and maintenance of long vacuous passages for light is not required.

Other objects, features, and advantages of this invention will become more apparent after reference to the following specification and attached drawings in which:

FIG. 1A is a perspective view of a chamber for generating a matrix of optical pulses all having non-overlapping paths, the perspective here omitting desired opaque side walls and the like and illustrating the light pulses in the form of solid schematic volume;

FIGS. 1B–1D are a cartoon series illustrating a rebounding pulse of light being shaved at the top portion thereof to emit the series of pulses of this invention;

FIG. 2A is a schematic of a laser amplifier between two confocal mirrors having input to one of the mirrors from off-axis scrambler mirror arrays;

FIG. 2B is an enlarged view of a typical scrambler array utilized in this invention;

FIG. 3A is an illustration of an off-axis laser amplifier having the incident and exiting path to the mirror primarily passing to the laser amplifier;

FIG. 3B is a side illustration of a Merscan telescope for expanding light rays in dimensions for perspective to laser amplifier of FIG. 3A;

FIG. 3C illustrates an on-axis secondary mirror for relaying light to a laser amplifier, the amplifier media here having a spatial gap in the center of the secondary element;

FIG. 3D is a telescope and laser amplifier combination similar to FIG. 3C wherein the amplifier is placed in the path of the primary optics for amplifying light exiting from the telescope only;

FIG. 4A is a cross-section of an evacuated tube illustrating a compression mirror array for causing light from sequential pulses to be condensed to a single simultaneous output in the form of a compressed optical pulse;

FIGS. 4B, 4C, and 4D are all respective cross-sections of the tube illustrating the placement of six concentric 48-element light paths in the interior of the vacuous tube; and FIG. 5 illustrates focusing optics for converging all of the light rays to a target for a compressed optical pulse.

FIG. 6A is a plane view of one of a pair of facilities according to this invention wherein respective amplifiers broadcast light to scrambler mirror arrays with the arrays thereafter reflecting light to compression optics and a target chamber; and, FIG. 6B is an illustration of a target chamber including concentrically located windows with an inner-vacuum chamber for location of the target.

For laser fusion at the 1 megajoule per pulse level a pulse length of about 10 nanoseconds is required. With a krypton-fluoride laser, such short pulses are possible with acceptable efficiency for low-energy lasers but not for high-energy devices. For high energy devices, a more reasonable laser power output duration is 500 nanoseconds. Thus, a pulse compression of about 50:1 is required. Moreover, it does not appear practical to attempt to extract as much as one megajoule of laser energy from a single device, at least not in a period as short as 500 nanoseconds. A more reasonable energy extraction level during such a period is about 100 kilojoules. This level of energy extraction leads to a "reasonable" size laser device but forces the simultaneous use of a multiplicity of laser devices, with the associated problem of focusing all of these laser beams on the fusion target simultaneously.

Providing the low-energy laser signal to "drive" the laser power amplifier can be conveniently separated into three tasks. The first of these is to produce a sequence of 48 laser pulses, each 10 nanoseconds long and each of which can be separated from the others on the basis of position (or direction). The second task concerns the amplification of this train of laser pulses to a power level sufficient to "drive" the main laser power amplifier. The third task concerns the optical arrangement needed to bring this train of laser pulses into the main power amplifier with the appropriate diameter and direction. The optical system to accomplish each of these three tasks is discussed below.

Our discussion will be couched in terms of the laser pulse train needed to drive a single laser power amplifier. It is obvious that at some point in the pulse train generation scheme, it is possible to beam split the pulse train to drive more than one laser power amplifier. That portion of the equipment for the three tasks to be shared (i.e., common to more than one laser power amplifier), and to be run in parallel (i.e., one unit for each of the laser power amplifiers) does not affect the basic technical feasibility here disclosed and is the subject of ordinary optic design. Feasibility will be established by our discussion in terms of the generation of the low-energy laser pulse train used to "drive" a single laser power amplifier.

While it is not feasible to attempt to operate a high-energy KrF laser on a 10 nanoseconds basis, at least not with useful efficiency, there is no special problem in obtaining a moderate- or low-power laser pulse of 10 nanoseconds duration from a KrF laser. (There may be some energy inefficiency, but at these low powers this need not concern us.)

We assume the generation of a KrF pulse shaped to have a large height to width aspect ratio. This exciting pulse—in the order of 10 nanoseconds in length is directed into the apparatus of FIGS. 1A through 1D.

In FIG. 1A, we show a simple optical arrangement in the form of pulse expander A for "stretching" this single short pulse into a set of 48 pulses, one 10 nsec behind the next, and each spatially resolved. The optical configuration constituting this pulse expansion network is shown in the perspective view of FIG. 1A. Front and rear mirrors 14, 16 are parallel to each other. Twelve stripper mirror surfaces 18a to 18l are also parallel to each other, but form a small angle, $\frac{1}{2}\theta_x$ and $\frac{1}{2}\theta_y$ with respect to the front and rear mirrors 14, 16. These angles are small but overemphasized in FIG. 1A to facilitate comprehension. It is important to note that there is a stripper mirror 18l at the top of rear mirror 16. Each of the stripper mirrors is separated by 1.5 m, corresponding to a temporal interval of 10 nanoseconds. The separation between the front and rear mirrors is $12 \times 1.5$ m or 18 meters.

The key to the proper operation of the pulse expansion network is the injection of the low-energy laser beam at a suitable angle with respect to a normal 20 between mirrors 14,16. In the view plot of FIG. 1A, the injected beam makes an angle of $\frac{1}{2}\theta_x$ with the normal 20 to the surfaces of the front and rear mirrors, and an angle of $\theta_y$ with respect to the normals (e.g. normal 21 to mirror 18e) to the surfaces of the stripper mirrors. In the view plot of FIG. 1A, the injected beam makes an angle of $\frac{1}{2}\theta_y$ with respect to the normal 20 to the front and rear mirror surfaces and is normal to the stripper mirror surfaces.

The pulse expansion network operates in such a way that the output will consist of an array of 48 laser pulses each parallel to the others and each having a cross-section of 0.03 m by 0.09 m. A square pattern of such a 48 beam assembly will be achieved if $\theta_y = (12 \times 0.3 \text{ m})/18$ m $= 2.00 \times 10^{-2}$ rad, and if $\theta_y = (0.09$ m$)/18$ m $= 5.0 \times 10^{-3}$ rad. There is, in addition, a requirement on the form of the injected beam's cross-section. Accordingly, the injected beam's is obtained by sufficiently expanding the cross-section of the output beam from a 10 nanoseconds pulsed laser oscillator and then passing the expanded beam through a rectangular mask 25 1.44 m high by 0.09 m wide.

As can be seen from an examination of FIG. 1A, the laser beam is injected just to the side of the front mirror and just below the level of the stripper mirrors. As the beam progresses toward the rear mirror, it moves inward from the side and upward. Because of the upward movement, 0.03 m high "slices" of the beam are intercepted by successive stripper mirrors, stripped off, and sent out of the pulse expansion network, exiting slightly upward. As a result of the 1.5 m spacing, the slices (actually 10 nanoseconds-long laser pulses) are sent out $2 \times 1.5$ m/$3 \times 10^8 = 10$ nsec apart. The geometry of the mirror arrangement means that the pulses each have a cross-section of 0.03 m above each other.

This pulse generation process is depicted in FIGS. 1B through 1D. The heavy bar 30 denotes about 1.5 nanosecond of the 10 nanosecond-wide input pulse, while the short dashes 38a–38l indicate a sequence of outgoing pulses.

FIG. 1C illustrates the input beam and the pulse train as the input beam travels back from the rear mirror to the front mirror. In this case, the top and bottom of the beam are straight lines with no part of the remaining portion of the input beam being intercepted. It is to be noted that when the injected beam starts back from rear mirror 16, twelve segments each 0.03 m high have been stripped off by the stripper mirror, sending out 12 pulses spaced 10 nanoseconds apart and leaving the injected beam with a height of 1.08 m. By the time the injected beam reaches the front mirror, it has moved inward 0.09 m as seen in 1A. The beam is thus completely intercepted by the front mirror, which it just passed on the side when first injected.

The injected beam now starts back towards the rear mirror, and, as it progresses, is successively intercepted by the stripper mirrors. A second set of pulses (starting with pulse 38a') is stripped off the top of the input beam. As indicated in FIG. 1D, the pulse 38a' is just 10 nanoseconds behind pulse 38l generated during the previous pass of the injected beam 30 from front to back. This process is repeated until the injected beam has reflected off front mirror 14 three times and made four reflections from back mirror 16. With each front-to-back pass, the bottom of the injected beam moves higher, until it reaches the level of the stripper mirrors and there is nothing left of the injected beam. At the same time, the beam has been moving inward, reaching the far end of the front mirror on its last bounce off of that mirror.

During this process, the injected beam has been completely stripped away, yielding 48 pulses, each 10 nanoseconds long and spaced 10 nanoseconds apart (i.e., no gap). Vertically, each stripped pulse is 0.03 m high, spaced 0.03 m (i.e. no gap) over each set of 12 pulses. Horizontally, the stripped pulses are 0.09 m wide and spaced 0.09 m apart (i.e., no gap). The form of this output beam compared to the injected beam is shown in FIG. 1E in the front view. At this point, we have a suitable laser signal to use for driving the high-power laser amplifier, except that its power is too low. With a gain of 200 in the high-power laser amplifier we need at least 500 J to drive the amplifier. We are more likely to have only about 5 J in our expanded laser pulse. It is therefore necessary to pass this laser pulse train through an intermediate-power laser amplifier.

Our beam now is about 480 nanoseconds long, so that we can pump an amplifier with a series of sequential beams in the order of 500 nanoseconds length. A potential for high-energy extraction efficiency is present. Unfortunately, the laser beam as we have formed it at the output of the pulse expander has position tightly correlated to time, and if we simply passed this beam through an amplifier, then at least 47 out of every 48 excimer molecules of the KrF gas (as energized) would decay spontaneously without having "seen" any laser radiation to induce stimulated emission. To solve this problem, we have configured the two-pass intermediate-power laser amplifier B as shown in FIG. 2A.

The design is based on a pair of scrambler mirror arrays 30, 31 and on a pair of "confocal" mirrors 32, 33. The laser beam bundle from the pulse expander is incident on the input scrambler mirror array. The scrambler mirror array consists of an assembly of 12 by 4 flat mirrors, each 0.03 m by 0.09 m area, so that the array has an area of 0.36 m by 0.36 m. The key feature of the scrambler mirrors is the fact that the tilt of each of the 48 mirrors in each array can be independently adjusted. A typical scrambler mirror array is schematically shown in FIG. 2B with mirror designated 48 a-1, 48a-1', 48a-1", and 48a-1'''.

Using this adjustability of the input scrambler mirror, each of the 48 10 nanoseconds long segments of the input laser pulse train is directed to a slightly different point on the secondary mirror. Each of these 48 segments is a collimated beam when incident on the secondary, each with a cross-section of 0.03 m by 0.09 m. The (negative) focal length of the secondary is chosen, so that when this segment/beam, after reflection off the secondary travels the distance to the primary mirror, the beam's cross-section has expanded to 0.10 m by 0.30 m. (This expansion applies to all 48 segment/beams.) The tilt of each of the flat mirrors of the input scrambler array is adjusted so that its segment/beam, when it reaches the primary mirror, will be exactly in registration with the 0.10 m by 0.30 m size of the primary. This arrangement results in each of the 48 beam/segments separately filling almost all of the laser amplifier volume 50, thus insuring efficient energy extraction from the gain medium.

Adjacent to the primary mirror is an apodizing stop 52. This will apply whatever apodization is desired equally well to all 48 beam segments to attenuate diffraction edges in the beams.

The fact that the primary and secondary mirrors represent a "confocal" pair 32,33 results in collimated beams after the second reflection off the secondary mirror, exactly matching the collimated input first incident on secondary mirror 32. Moreover, with these collimated beams, the higher laser power segment/beams reflected off the secondary mirror after leaving the gain medium. They represent a mirror image in direction as well as degree of collimation of the beams leaving the input scrambler mirror array 30. Thus, the higher power segment/beams incident on the output scrambler array 31 represent a one-to-one map of the pattern at the input scrambler array. By properly adjusting the tilt of the individual mirror elements in the output scrambler array 31, it is then possible to reconstitute the expanded beam as a collimated bundle of rays. The total energy will be about 500 J, and the total cross-section will be about 0.36 m by 0.36 m. The cross-section will consist of 48 segments each 0.03 m by 0.09 m, each segment being "excited" for 10 nanoseconds, one segment at a time for a total period of 480 nanoseconds. This beam is nominally suitable for driving the large laser power amplifier shown in FIG. 3A.

The large laser power amplifier 60 is embedded in an off-axis section of a cassegrain telescope C with a beam diameter magnification of 10:1, as indicated in FIG. 3A. Since the telescope's primary will have the same cross-section as the output laser beam, i.e., 1 m by 3 m, then the input segment/beams have to have a cross-section of 0.1 m by 0.3 m. This implies that the cross-section of the output scrambler mirror's output beam will have to be increased by 10:3. This expansion of the beam's cross-section will be accomplished by an off-axis section of a Merscen telescope shown in FIG. 3B.

Merscen telescope includes an entrance port 71 to a secondary mirror 72. Rebounding from secondary mirror 72, light is expanded to the primary mirror 73 and then reflected out exit port 74. It will be generally appreciated that light entering will have a relatively high angularity in the expander telescope and that light exiting will have a reduced angularity. At the output, the beam will have a 1.2 m by 1.2 m cross-section and will consist of 48 segment/beams, each 10 nanoseconds long and having a cross-section of 0.1 m by 0.3 m.

The last step in preparing this beam for input to the large laser power amplifier concerns the need to give each segment/beam an appropriate position and orientation for incidence on the secondary mirror of the amplifier's telescope. The choice of position and orientation relate to the need to have each segment/beam come out of the amplifier convergent on one of the elements of the distribution mirror array at the far end of the pulse compression tank. The position and orientation control can be easily achieved by the use of a pair of scrambler arrays matched to the beam size (for example, see detail of FIG. 2B). One of the arrays will need a somewhat irregular positioning of the mirror elements but this can be incorporated into the design with a moderate degree of mirror element oversize to accommodate any need for adjustment. Thus, the beam is prepared for input to the laser power amplifier.

Referring to FIG. 3A, the main amplifier 60 is shown enclosed within an off-axes cassegrain telescope, including a secondary mirror 62 and off-axes primary 63. Input beams address the secondary 62 along a plurality of angularly different input paths generally denominated at 64. Output occurs along a similar plurality of paths generally denominated 65. In accordance with the wellknown rules of magnification, the angularity of the paths out 65 is less then the angularity of the paths in 64.

It should be noted that the amplifier here shown includes a double pass through of light with essentially collimated output 65. It will, of course, be realized that the telescope can also become a vehicle for focus. For example, convergence or divergence can be assigned to the light as it enters or leaves the telescope dependent upon the optical train desired.

It will be realized that the advantages of incorporating laser amplifier within a telescope will admit of a number of different configurations. For instance, an on-axes cassegrain telescope is illustrated in FIG. 3C. In FIG. 3C, gain medium 70 is illustrated between a secondary mirror 72 and a primary mirror 73. Gain medium 70 is provided with a central aperture stop 74, which is coincident to the aperture produced by the secondary mirror 72. As shown, feed to the mirror can be produced by an off-axes scrambler mirror array 75. Light output is here illustrated as collimated.

Where desired, such telescope configurations can be configured for a single pass. This may be done in the amplifier array shown in FIG. 3D. The gain medium 80 is shown located along the output from the primary mirror 83. Secondary mirror 82 is fed by an off-axes scrambler array 85. As in the case previously illustrated, the aperture produced by secondary 82 is present in the gain media at 84.

The preferred lasing media illustrated in this application is krypton fluoride. As has been emphasized, other media may be used. The mode of exitation of the krypton fluoride has herein not been illustrated. As the mode of exitation is sufficiently described in Robert Olin Hunter pending U.S. patent application entitled "Compressed Pulse Laser", Ser. No. 960,393, filed Nov. 13, 1978, now U.S. Pat. No. 4,264,869, issued 4/28/81, it will not be repeated herein.

With the general design configurations established, the disclosed amplification can be discussed. Because of the properties of the preferred KrF excimer, the time in which pump energy will remain within the laser medium is only about 2-nanoseconds. However, it is not possible to get with reasonable efficiency the required total pump energy into the laser medium in less than about 500-nanoseconds. Thus, in order to efficiently extract the laser energy, the laser pulse being amplified must have a duration of about 500 nanoseconds. The pulse-stretching apparatus of FIGS. 1A through 1D solves this problem.

The high-energy laser output will have a 500 nanosecond duration. Our basic problem is how to compress this pulse, retaining most of the energy but shortening the duration of the final output to about 10 nanoseconds.

The pulse compression technique used is based on running a series of 10 nanosecond-long laser pulses through the amplifier, one immediately after the other, each passing through in a slightly different direction or angularity. This sequence of pulses will last about 500 nanoseconds, thus providing for extraction of all the laser energy available during virtually the entire 500 nanosecond duration of the pumping electric discharge pulse. Because of the slight difference in the direction of each of the laser pulses being amplified, the direction of the output of the laser power amplifier will change every 10 nanoseconds. This provides a basis for subsequently separating the output into 10 nanosecond-long segments and running each through a separate optical path, applying an appropriate time delay to each segment. Thus, the laser power amplifier output will be divided into about 50 segments, which will be brought into temporal synchronism. Synchronism here refers to a period short compared 10 nanoseconds, ten-nanoseconds, and not to a period short compared to the optical period, i.e., to $(c/\lambda)^{-1} = (3 \times 10^8 / 0.25 \times 10^{-6})^{-1} = (1.2 \times 10^{15})^{-1} = 8.33 \times 10^{-16}$ seconds.

Each of the segments can then be simultaneously focused on the laser fusion target. This is accomplished simultaneously with the arrival of the segments from the outputs of all the other lasers needed to reach the 1 megajoule total energy requirement.

The optical design can thus be separated into two parts. First, there is the need to generate the 50 low-energy laser pulses, each 10 nanoseconds long, following one another in close order in time, and then to arrange for these pulses to be injected into the laser power amplifier, each with a slightly different direction. Second, there is the need to accomplish the pulse compression of the output and to bring it to focus on the laser fusion target. These two classes of functions are accomplished in quite separate parts of the optical system.

Survival of optical surfaces handling high-power laser beams requires that the flux density be constrained. For a 500 nanosecond-long period of irradiation, the integrated power density must be less than 5 J/cm². For a 10 nanosecond laser pulse, the integrated power density must be less than 1 J/cm². The 5 J/cm² constraint means that for the survival of the output window of the laser power amplifier, the cross-section of the laser beam must be at least $2 \times 10^4$ cm², if the output energy is to be of the order of $10^5$ J. We plan to use a laser power amplifier with an output beam cross-section of 1 m by 3 m, so that this constraint is satisfied.

The 1 J/cm² constraint means that optics handling each of the 10 nanosecond segments of the power amplifiers output (in the pulse compression system and beyond) must have a cross-section of at least $2 \times 10^3$ cm². This assumes that the laser energy per 10 nanosecond segment is $2 \times 10^3$ J, so that 50 segments would represent the $10^5$ J total output. The beam cross-section for each of these pulse segments will have a 3:1 aspect ratio (corresponding to that of the laser power amplifier). Hence, the optics handling each of these 10 nanosecond segments in the pulse compression system will have to have a cross-section of at least 0.258 m by 0.775 m. In fact, we shall use somewhat larger optical elements to facilitate maintenance of system alignment.

Based on an expected energy gain of 200:1 in the laser power amplifier, the laser beam input to the amplifier need only have an energy of 500 J over the entire 500 nanosecond period. For 50 separate 10 nanosecond long pulses comprising the total input to the laser power amplifier, each 10 nanosecond-long pulse will have to have an energy of only 10 J. This implies a required cross-section for each pulse of at least 10 cm², and for a 3:1 aspect ratio, dimensions of at least 1.83 cm by 5.48 cm. In fact, we work with considerably larger beam cross-sections before the laser power amplifier, with laser energy densities between 0.37 J/cm² and 0.033 J/cm².

The optical system described will be based on 12 laser power amplifiers arranged in two sections of six each. Each laser power amplifier will handle 48 separate 10 nanosecond-long input laser pulses. It will, of course, be appreciated that these numbers may vary. For example, 12 instead of 10 and 48 instead of 50 can be used. These differences have no real impact on system feasibility.

FIGS. 4A through 4D illustrate details of the pulse compression system used to bring all 48 10 nanosecond-long segments out of a single laser power amplifier into temporal synchronism. The long tank 90 used to provide the various path lengths that will bring all of the segments into synchronism is shown in FIG. 4A. This tank is about 130 m long by about 12 m in diameter, is provided with a vacuum and suitable windows, and is designed to handle the output from six laser power amplifiers. There are naturally two such tanks required for the entire system with only one tank being illustrated.

FIG. 4A is a cross-section with the middle portion broken away which includes the length of the tank. In FIGS. 1A and 1B, the cross-section of the tank, taken perpendicular to the length are shown. The middle section of the tank is broken away to reduce the drawing to manageable size.

FIG. 4B shows the cross-section near the end of the tank at which the six laser power amplifier outputs are introduced into the tank through windows 100a through 100f. FIG. 4C shows the cross-section at the opposite end of the tank.

FIG. 4B illustrates the six rectangular windows, 1 m by 3 m, through which the output of the six laser power amplifiers are introduced. These windows are distributed uniformly about the circumference of this cross-section. To indicate the symmetry of the arrangement, a 60° slice (the "unit cell" 102) is shown. The cross-section at the other end of the pulse compression tank, shown in FIG. 4C, depicts the laser beam exit port 108 and six sets of "distribution mirror arrays 100a through 110f".

To show the six-way symmetry of this arrangement, a 60° unit cell slice 102 is indicated in FIG. 4C also. The details of the distribution mirror array are shown in FIG. 4D. The array, of which there are six in the pulse compression tank, consists of 48 rectangular cross-section mirrors. Each mirror is nominally 0.258 m by 0.775 m, and is a weak negative power spherical surface, i.e., the mirrors are convex with a rather large radius of curvature. The tilt of each element in the array is independently adjustable.

It will be noticed from consideration of FIGS. 1B and 1C that the full array does not fit within the 60° slice and that there are interferences between adjacent arrays. To avoid this, in each array the mirrors labeled 120 through 123 in FIG. 4D will be removed and will be replaced by the mirrors labeled 120', 121', 122', and 123'. The following discussion of the operation of the pulse compression tank will ignore this replacement.

Matching each mirror in the distribution mirror array is a return mirror located close to the cylindrical wall of the tank. There are thus six times 48 such mirrors. In FIG. 4A, only three mirrors, 115a, 115b, and 115c are shown on each side of the tank diameter. In total, there are 12 such mirrors. This is for one cross-section slice, with each of the 12 being part of a set of 48 that go with one of the distribution mirror arrays. The other 36 mirrors not shown or otherwise considered thus far are at three different cross-section heights, with each of the 48 return mirrors being a different distance from the end of the tank.

Each of these return mirrors is rectangular in cross-section, 0.258 m by 0.775 m, with a flat reflecting surface. The key feature of the return mirrors is their differing distances from the distribution mirror array. The distance is nominally 1.5 m, corresponding to the distance light travels roundtrip in 10 nanoseconds. This factor makes it possible for the pulse compression tank to bring all 48 segments of the laser power amplifier's output into temporal synchronism.

To illustrate the operation of the pulse compression tank, we shall consider the output from one of the six laser power amplifiers, together with the distribution mirror array diagonally opposed to the laser window, and the 48 return mirrors associated with that distribution mirror array. The 48 return mirrors are on the same side of the tank as the laser window. The relevant elements and light rays are indicated in FIG. 4A, which provides a basis for the following explanation.

In the preferred embodiment here illustrated, the beam emanating from the laser amplifier is not collimated but rather is slightly convergent, coming to a focus at a range of about 175 m. As a consequence, by the time the laser beam reaches the distibution mirror array, which is at a range of about 130 m, the beam's cross-section has decreased from its initial value of 1 m by 3 m, to only 0.258 m by 0.775 m. This just matches the nominal size of the elements of the distribution mirror array. As remarked previously, the direction of the low-energy laser beam input to the laser power amplifier is changed every 10 nanoseconds, so that the orientation of the high-energy output correspondingly changes at the end of each 10 nanosecond-long segment of the output. By suitable adjustment of the input laser beam, the output is exactly registered on one of the 48 elements of the distribution mirror array. The element it is registered on changes every 10 nanoseconds, "scanning" the array in discrete steps in a well-defined pattern.

The convex reflecting surface of the elements of the distribution mirror array each have a radius of curvature of about 90 m, so that the converging laser beam when reflected off of the element is collimated. Preliminary analysis indicates that because of the very small angles involved, and because of the very large radius of curvature, these mirror elements should adequately yield aberration-free performance with spherical (rather than spheric) surfaces.

The tilt of the discrete mirror element from mirror array 110d determines to which of the return mirrors on the opposite wall the collimated laser beam will go. This return mirror element is selected on the basis of the range to that return mirror and the time at which that element in the distribution mirror array is illuminated. The return mirror is flat and so does not alter the collimated nature of the laser beam. Its tilt is so adjusted as to direct the laser beam through the exit port 108. All of the return mirrors direct the laser beam through the exit port, and, in fact, are so adjusted in tilt (taking into account the laser beam's direction from the relevant element of the distribution mirror array), that all of the laser beam 10 nanosecond segments passing through the exit port are parallel. By virtue of the choice of ranges to the various return mirrors, not only are all the segments traveling in a parallel direction as they pass through the exit port of the pulse compression tank, but they are also in synchronism. That is, the segments all pass through the exit port at the same time. It goes virtually without saying that the six lasers are suitably synchronized, that all of their segments pass through the exit port at this same time.

The distribution of the return mirrors 115a, etc. (in particular, the distance that they stand off of the tank wall), have been so that the 48 laser beam segments not only pass through the exit port of the pulse compression tank traveling in parallel directions, and at the same time, but also in a uniform area-filling manner. None of the 48 beams overlap, nor is there any significant gap between the beams. Thus, the laser output from the pulse compression tank appears not as 48 eight beams, each of a 0.258 m by 0.775 m, but rather as a single beam with a cross-section of (12×0.258 m) by (4×0.775 m), i.e., 3.10 m by 3.10 m. This single output beam is only 10 nanoseconds long, and has a well-defined direction of travel, representing the desired pulse compression. Since there are six laser power amplifiers input to the pulse compression tank, there will be six such compressed pulse laser beams leaving through the exit port. The six beams will differ only in their direction of travel.

After leaving the pulse compression tank via the exit port, the time-compressed high-energy pulse will proceed directly into the focusing tank shown in FIG. 5. Six beams 200a through 200f enter the focusing tank through this port. At the other end of the focusing tank, another six beams, 200a' through 200f', enter from a second pulse compression tank and the other six of the total of twelve laser power amplifiers. The six beams from each end travel about 35 m from their port, at which point they have fully separated. They are then intercepted by large focusing optics. The focusing mirrors are of the order of 3.1 m by 3.1 m square cross-section, each with a focal length of about 10 m with 6 mirrors 210a through 210f for respective beams 200a through 200f, and 6 mirrors 210a' through 210f' for respective beams 200a' through 200f'. Altogether, there are 12 such mirrors, each aligned so as to (at least nominally) bring each of the 12 laser beams to focus at the same point. Each of the mirrors will be an off-axis section of a parabola, so as to avoid aberrations due to the large off-axis angles involved.

With the laser target T placed at this common focal point, target burn should be achieved. Laser beams will be incident from front and back in a fully balanced pattern. The laser pulses can together convey about 1 megajoule of energy, all of it arriving within a single 10 nanosecond period.

It will be remembered that with respect to the compression optics illustrated in FIGS. 4A–D and the focusing optics of FIG. 5 that the light paths therein contemplated were all in a vacuum. These vacuous paths were in large measure required by the single outlet 108 in the vacuum tube and the high optical flux encountered therein.

In FIGS. 6A and 6B we show an alternate configuration wherein vacuum may be avoided.

Referring to FIG. 6A individual amplifiers 300A–300F are shown addressing relay mirror arrays. Scrambler mirror arrays 310 reflect light from amplifiers 300A–300C. Scrambler mirror arrays 311 reflect light from amplifiers 300D–300F.

A building 314 encloses a conically shaped and projecting housing 315. This housing includes at the sides 317 thereof an array of mirrors 318. These mirrors in cooperation with the scrambler arrays of mirrors 310, 311 provide a compression of pulses. The resultant rays are incident upon a target T. Target T is more fully illustrated in FIG. 6B.

It will be understood that FIG. 6A will provide energy approaching target T from the direction of ray 320. A similar opposed structure will bombard target T with energy from the direction of ray 321. This complete structure, a duplicate of that shown in FIG. 6a, is omitted here for purposes of clarity.

Referring to FIG. 6B, it will be seen that a focusing structure is there shown for causing all rays to converge to target T.

Specifically, target T is contained in the center of a chamber 400. Chamber 400 in turn is provided with 12 windows. Six of these windows receive optical energy from the direction of ray 320; the remaining six windows receive optical energy from the direction of ray 321. Chamber 400 is preferably in a vacuum.

Considering the case of the rays 320, the output of each of the amplifiers (or 1/6 the output of all the optical amplifiers) will be incident on each mirror of a group of mirrors 410A–410F. These mirrors will thereafter focus through respective windows 411A–411F through the walls of chamber 400 to a central target T. It will be noted that some of the mirrors and windows are hidden from view.

Each of the mirrors 410A–410F occupies an angular interval of 30°. In total six of the mirrors 410A–410F occupy an angular interval about chamber 400 of only 180°. By providing a simple and identical assembly for rays 321 focusing of the shock wave on a mirror image basis from the opposite direction can result.

As distinguished from the optical compression network illustrated in FIGS. 4A–4D, it will be appreciated that here all waves do not exceed the same aperture. Instead the compressed waves from each amplifier follows its own charge to the focusing optics. This being the case, transmission in an air media of the optical shock waves is possible.

What is claimed is:

1. Process for passing and amplifying discrete pulses of light comprising the step of
   providing a first mirror array of discrete mirrors
   introducing a series of light pulses at along non-intersecting paths to each said mirror of said first mirror array;
   providing a telescope including a primary optic and a secondary optic;
   aligning each said mirrors of said first mirror array to each reflect light to said secondary optic for passage through said telescope to said primary along paths which intersect but have differing angularities from the light of all other said paths;
   providing a laser amplifier having an amplifying optic path therethrough for amplifying all of said series of light pulses in sequence upon passage through said telescope; and
   providing a second scrambler mirror array of discrete mirrors
   aligning each said mirror of said second mirror array to direct light from said telescope and amplifier with discrete output paths from one another.

2. The process of claim 1 including the step of placing said secondary optic on-axis.

3. The process of claim 1 and including the step of placing said secondary optic off-axis.

4. The process of claim 1 and including the step placing said amplifier outside of the optic path between said telescope primary and secondary optics.

5. Apparatus in combination with a laser amplifier for generating a plurality of discrete sequentially amplified pulses addressed at differing angularities from a laser amplifier comprising in combination: a telescope including a primary optic and a secondary optic and having a light expanding path from said secondary optic to said primary optic; means for generating a succession of beams of varying angularity converging to said secondary optic along paths for passage through the primary optic of said telescope; first scrambler mirror array of discrete mirrors, each said mirror for receiving light pulses from said generating means and directing light to said telescope secondary optic for passage through said telescope; a second scrambler mirror array of discrete mirrors, each said mirror for receiving light pulses from said telescope and amplifier to direct amplified light along paths of differing angularity; said telescope between said first and second mirror array including a substantially constant focal length for all light paths therethrough; and a laser amplifier including windows whereby the emitted beam passes through the active media of said laser amplifiers at substantially angularities of light emitted from said primary.

6. The apparatus of claim 5 and wherein the optics of said telescope are mirrors.

7. The apparatus of claim 5 and wherein the secondary optic of said telescope is on-axis.

8. The apparatus of claim 5 and wherein the secondary optic of said telescope is off-axis.

9. The apparatus of claim 5 and wherein said secondary optic is on-axis and said laser includes an aperture in said lasing media conicident to the aperture of said secondary optic produced at said lasing media.

10. A laser for producing simultaneous optical shock waves comprising in combination
means for generating a plurality of sequential temporally spaced beams all having discretely different light paths;
a telescope having a primary optic and a secondary optic with an optic path therebetween for receiving said sequential temporally spaced beams;
a first mirror array having discrete mirrors, each said mirror for directing one of said plurality of sequential temporally spaced beams to said secondary at along paths of discrete angularity for each beam to pass along different and intersecting paths from said secondary to said primary;
a laser amplifier having an optical amplifying path passing therethrough, said laser registered at said amplifying path to the primary of said telescope to provide at least some amplification to light passing through said telescope;
a pulse compression network having temporally spaced mirrors directed toward a target to eliminate the temporal order of said beams from said sequential beam generating means and to provide for simultaneous emission of all said light pulses;
a second mirror array having discrete mirrors between said telescope and said pulse compressor network, each said discrete mirror directing one of said plurality of sequentially amplified pulses to one of said temporally spaced mirrors to eliminate the temporal spacing from said beam generation means; and, focusing optics for directing said beams simultaneously to a target.

11. The invention of claim 10 and wherein said primary and secondary optics are mirrors.

12. The invention of claim 10 and wherein light passing through said telescope from a mirror on said first mirror array to another mirror on said second mirror array has the same focal length for all light paths.

13. The invention of claim 10 and wherein said secondary optic is on-axis.

14. The invention of claim 10 and wherein said secondary optic is off-axis.

15. The invention of claim 10 and wherein said pulse compression network is within a vacuum.

16. Apparatus for focusing a series of temporally spaced sequential light pulses to an optical shock wave at a target with the temporal spacing eliminated from said wave comprising:
at least first and second laser amplifiers each emitting to respective first and second paths a series of sequentially amplified temporally spaced waves;
first and second optical compression networks in said respective first and second paths having discrete individual paths for each temporally spaced waves to eliminate the temporal spacing thereof and produce substantially simultaneous wave emission to respective first and second beam exit paths directed to said target;
a first set of focus mirrors behind and around a target at first angular interval around said target for directing said simultaneous wave emissions from said first beam exit path to said target;
a second set of focus mirrors behind and around a target at second angular interval around said target for directing said simultaneous wave emissions from said second beam exit path to said target;
said first and second sets of angular intervals around said target defining non-vignetting paths of access to said focus mirrors for focus to said target.

17. The apparatus of claim 16 and wherein said target is contained within a vacuum chamber.

18. The apparatus of claim 16 and wherein six laser amplifiers emit to a first path, a first optical compression network and said first exit path at said first set of angular intervals around said target and wherein six laser amplifiers emit to a second path, a second optical compression network and said second exit path at said second set of angular intervals around said target.

19. The apparatus of claim 16 and wherein all said light pulses in said apparatus propagate to said focus mirrors in the air.

20. A process for passing sequential light pulses through a single discrete laser amplifier including the steps of providing a telescope including a primary otpic, and a secondary optic; introducing each of said sequential light pulses at varying angularity for passage through said telescope to said secondary optic; placing a laser amplifier with a light amplification media having a window substantially coincident to the area of said primary; whereby said sequential pulses will all pass through said laser amplifier with discrete angularity of emission from said primary.

21. The process of claim 20 and including the step of placing said secondary optic off axis with respect to said primary optic.

22. The process of claim 20 and including the step of placing said secondary optic on axis.

23. The process of claim 21 and including the step of providing said laser amplifier with an obstruction to said amplification media coincident with the obstruction provided by said on-axis secondary.

24. The process of claim 20 and including the step of placing said laser amplifier outside of the light path between said primary and said secondary optic.

25. Apparatus in combination with a laser amplifier for generating a plurality of discrete sequentially amplified pulses addressed at differing angularities through said laser amplifier comprising in combination: a telescope including a primary optic and a secondary optic and having a light expanding path from said secondary to said primary; means for generating a succession of beams of varying angularity converging to said secondary along paths for passage through the primary of said telescope; and a laser amplifier with lasing media therein juxtaposed to the emitted path from said primary; said amplifier including windows whereby the emitted beam passes through the active media of said laser amplifiers at substantially angularities of light emitted from said primary.

26. The apparatus of claim 25 and including wherein said secondary is off axis with respect to said primary.

27. The apparatus of claim 25 and wherein said secondary optic is on axis withrespect to said primary.

28. The apparatus of claim 27 and wherein said lasing media has an aperture therein approximately coincident to the aperture at said amplifier produced by said on axis secondary optic.

29. The apparatus of claim 25 and wherein said optics are mirrors.

* * * * *